E. T. GIBSON.
AUTOMOBILE INTENTION SIGNALLING DEVICE.
APPLICATION FILED MAR. 29, 1921.
1,422,960.
Patented July 18, 1922.
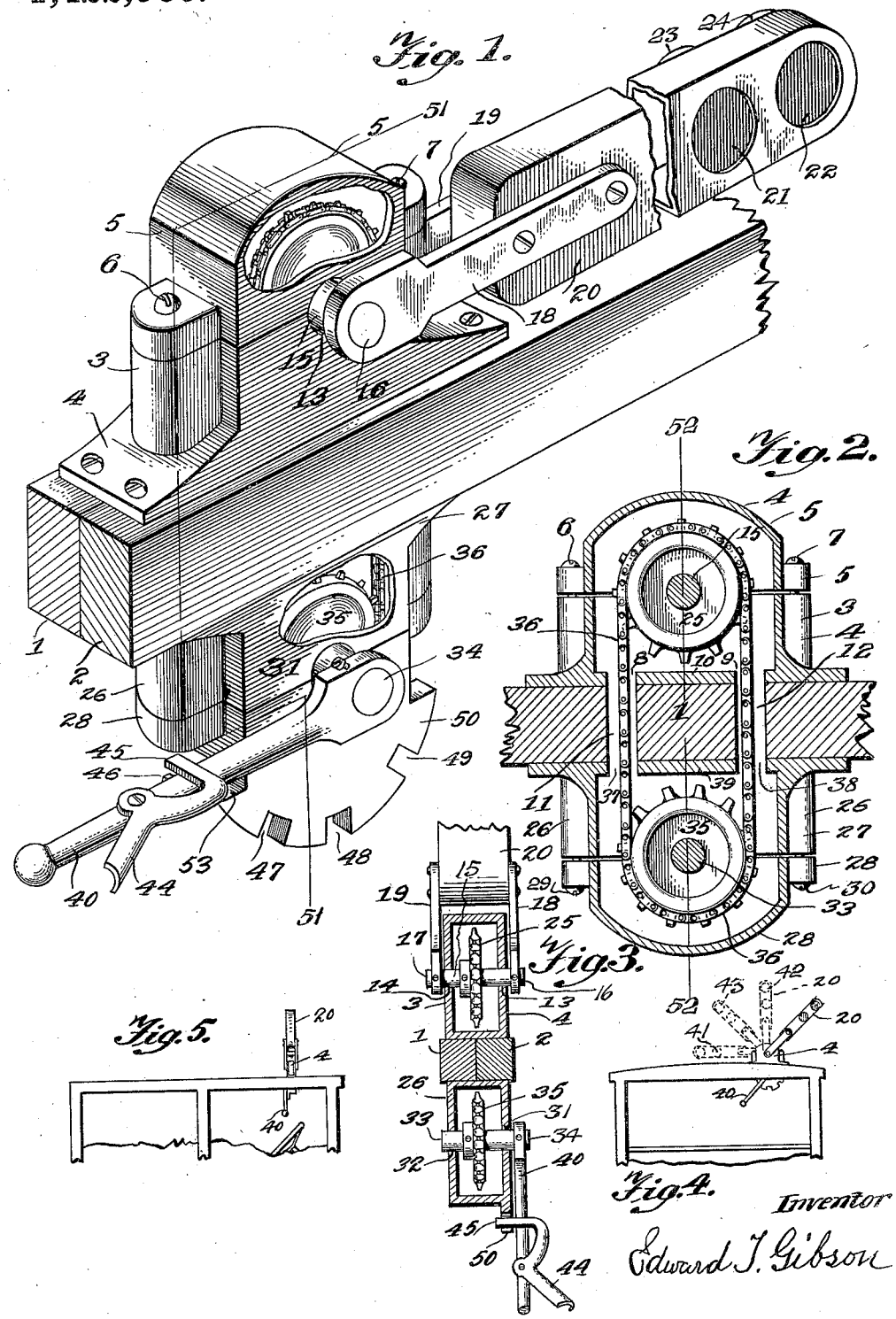

UNITED STATES PATENT OFFICE.

EDWARD TINKHAM GIBSON, OF BROOKLYN, NEW YORK.

AUTOMOBILE INTENTION-SIGNALING DEVICE.

1,422,960.

Specification of Letters Patent.   Patented July 18, 1922.

Application filed March 29, 1921. Serial No. 456,640.

*To all whom it may concern:*

Be it known that I, EDWARD TINKHAM GIBSON, a citizen of the United States, and a resident of the city of New York, borough of Brooklyn, in the county of Kings and State of New York, have invented a new and Improved Automobile Intention-Signaling Device, of which the following is a full, clear, and exact description.

My invention relates to signal-arm-bearing devices adapted to be manually operated from within a "closed" automobile to signal to outsiders the operator's intention to stop his moving car or to turn it to the left or to the right; and the object of my invention is to provide a signaling device in which the manual operation from within a "closed" automobile of a signaling-arm disposed above the roof of the car and arranged to be swung in a vertical plane to positions adapted to signal to outsiders the operator's intended movements of the car is performed through a mechanism which is so housed that rain coming down onto the roof of the car can not penetrate through the mechanism into the interior of the car. This object is accomplished by the mechanism illustrated in the accompanying drawing in which Figure 1 is a perspective view, from the rear, of my automobile intention-signaling device mounted on a cross-bar (only a section of which is shown in the figure) in the frame-work of the roof of a "closed" automobile.

Fig. 2 is a rear view of a vertical longitudinal section taken through 51—51 of Fig. 1. In this sectional view the signaling-arm is not shown.

Fig. 3 is a side view of a vertical transverse section taken through 52—52 of Fig. 2.

Fig. 4 is a front view of an automobile (only a part of which is shown) provided with the signaling device.

Fig. 5 is a side view of an automobile (only a part of which is shown) provided with the signaling device.

Similar numerals refer to similar parts throughout the several views.

The numeral 1 represents a section of a cross-bar in the framework of the roof of a "closed" automobile. This bar is usually only three-quarters of an inch thick, and, while my signaling device can be secured to it, yet I prefer that a cleat 2 be added to the bar to increase its thickness. Fixedly secured to the top surface of said cross-bar (the material of the roof intervening,—but not shown) and extending upwardly from a point on the roof of the automobile (see Figs. 4 and 5) is the body-portion 3 of a housing-member 4 having a cover-portion 5 which latter is detachably secured to the said body-portion by screws 6 and 7, and which housing-member is, by this construction, adapted to keep rain from entering into its interior and thereby keep rain from entering into the interior of the automobile through openings 8 and 9 (see Fig. 2) which exist in the base-plate 10 of the said housing-member and which openings are, respectively, continuous with openings 11 and 12 formed in the said cross-bar 1 for a purpose which will hereinafter be shown.

Rotatably mounted in bearing-openings 13 and 14 (see Fig. 3) in the said housing-member 4 is a shaft 15 having end-portions 16 and 17 which end-portions extend outwardly from the said housing-member.

Fixedly secured to the said outwardly-extending end-portions 16 and 17 of the shaft 15 are, respectively the leg-pieces 18 and 19 of a signaling-arm 20 having in its rear side two red-colored lantern-glasses 21 and 22 and in its front side two white lantern-glasses 23 and 24, which glasses are adapted to be illuminated by lamps (not shown), preferably electric, disposed within the interior of the arm.

Carried by the said shaft 15 and disposed within the interior of the said housing-member 4 is a sprocket-wheel 25.

Fixedly secured to the under-surface of the said cross-bar 1 (the material of the lining of the roof of the automobile intervening, but not shown) and extending downwardly in vertical alignment with the hereinbefore described housing-member 4 is the body-portion 26 of a hanger-member 27 having a cover-portion 28 which latter is detachably secured to the said body-portion 26 by screws 29 and 30.

Rotatably mounted in bearing-openings 31 and 32 (see Fig. 3) in the said hanger-member 27 is a shaft 33 having an end-portion 34 which latter extends outwardly from the said hanger-member.

Carried by the said shaft 33 is a sprocket-wheel 35. Operatively connecting the said sprocket-wheel 35 with the said sprocket-wheel 25 is an endless sprocket-wheel chain 36 (see Fig. 2) which is disposed to travel through openings 37 and 38 in the base-plate 39 of the hanger-member and through the hereinbefore described openings 11 and 12 in the cross-bar 1 and the openings 8 and 9 in the base-plate 10 of the housing-member 4.

Fixedly secured to the said outwardly-extending end-portion 34 of the said shaft 33 in the hanger-member 27 is a handle 40 adapted to be manually operated to rotate the said shaft 33 and thereby, through the agency of the said sprocket-wheel 35 and endless sprocket-wheel chain 36 and sprocket-wheel 25 and shaft 15, cause the said signaling-arm 20 to turn from a normal or non-display position in which, as is illustrated by the dotted outline 41 of the signaling-arm in Fig. 4, the long axis of the signaling-arm lies practically parallel with the horizontal plane of the roof of the automobile to and from positions at an angle with the horizontal plane of the roof of the automobile as is illustrated in Fig. 4 by the full outline of the said signaling-arm 20 and by the dotted outlines 42 and 43 of the said arm.

From the description given it will be seen that the movement of the said signaling-arm to a vertical position, as is illustrated in Fig. 4 by dotted outline 42 of the said arm could be adopted as a signal to outsiders that the operator of the signaling-arm intended to stop his moving car, and that a movement of the said arm to a position in which it is inclined to the left (as illustrated by the full outline of the arm 20 in Fig. 4) could be adopted as a signal that the operator intended to turn his moving automobile to the left; and that the inclining of the said arm to the right (as is illustrated by the dotted outline 43 of the said arm in Fig. 4) could be adopted as a signal that the operator intended to turn his automobile to the right.

To make it unnecessary for the operator of the signaling device to retain his hold on the said handle 40 after he has turned the signaling-arm to the particular position he wishes it to take for a while, the said handle 40 is provided with a catch-piece 44 having off-sets 45 and 46. This catch-piece 44 is pivotally mounted on the handle (40) and is adapted to be operated to cause the said off-sets 45 and 46 to move into and out of the notch 47 or the notch 48 or the notch 49 in the locking-plate 50 carried by the hanger-member 27.

While I have said that my signaling device is for use in combination with a "cross-piece" in the framework of the roof of a closed automobile, it must be understood that when the roof of the car is not of leather but of wood the device will be secured to the wood. As the shaking of the automobile when travelling would cause the signaling-arm to "pound" as it lay in its non-display position if means were not provided to prevent it, the described locking-plate (50) is provided with a special "notch" 53 which engages the catch-piece (44) when the signaling-arm is in its non-display position.

Having thus described my invention, what I claim as new and desire to secure by Letters Patent, is:—

The combination with the roof of an automobile of an intention-signaling device comprising a housing-member secured to and projecting upwardly from said roof and adapted to keep rain from entering its interior and having in its bottom an opening disposed in vertical alignment with a co-operating opening in said roof; a signal-arm-turning shaft rotatably mounted in bearings in said housing-member to turn on a horizontal axis lying in parallel relation with the front-to-rear axis of the automobile and having a body-portion disposed within the interior of said housing-member and an end-portion extending outwardly from said housing-member; a shaft-rotating member carried by the said body-portion of the shaft; a signaling-arm carried by the said end-portion of the shaft to travel in a vertical plane; a hanger-member having a locking-plate and fixedly supported beneath and in vertical alignment with said housing-member and projecting downwardly from the plane of the surface of the top of the interior of the car; a handle-member carried by said hanger-member and mounted to be manually swung on a horizontal axis lying in parallel relation with the front-to-rear axis of the automobile; a catch-member carried by said handle-member; and means connecting the said handle-member with the said shaft-rotating member whereby manual operation of the said handle-member will operate to cause rotation of the said signal-arm-turning shaft and resultant movement of the said signalling-arm; said locking-plate having catch-engaging openings at predetermined points in its body, and said catch-member adapted to be manually operated to cause it to engage any one of the said catch-engaging openings in the said locking-plate to temporarily hold the said handle-member in a desired position.

EDWARD TINKHAM GIBSON.

Witnesses:
MAUD C. GIBSON,
JAMES WORRELL.